United States Patent Office 2,994,691
Patented Aug. 1, 196:

2,994,691
INFLUENCE OF OXYGEN ON THE POLYMERIZATION OF OLEFINS
Stephen Gates, Charleston, W. Va., assignor to Union Carbide Corporation, a corporation of New York
No Drawing. Filed Dec. 2, 1957, Ser. No. 699,906
8 Claims. (Cl. 260—94.9)

The present invention relates to a process for increasing the rate of polymerization and the yield of polymer produced per unit of catalyst in the polymerization of alpha-olefins with certain metalorganic catalysts at low pressures. More specifically, this invention relates to the use of oxygen or an oxygen-containing gas such as air in contact with the reaction medium of the catalyst and an alpha-olefin to increase the speed of polymerization and the yield of polymer produced per unit of catalyst.

It is known that the combination of certain compounds of the transition metals of the group IV–B, V–B and VI–B of the periodic table, for example the halides, with organometallic compounds or metal hydrides of aluminum or members of group I–A and II–A of the periodic table, when mixed in an inert liquid hydrocarbon diluent form a catalyst complex. The exact nature of this complex is not known, but when an alpha-olefin is brought in contact with the suspension of catalyst in the diluent, polymerization occurs and a resinous product results.

Ordinarily, the catalyst complex is prepared by reacting the transition metal compound and the group I–A, II–A or aluminum compound to form a slurry of the catalyst complex in the inert diluent at room temperature.

In the past it was believed by those skilled in the art that oxygen should be excluded from the polymerization reaction because it would have a deleterious effect on the catalyst. I have now found that when the polymerization is carried on at temperatures above 125° C. that the rate of the reaction and the quantity of polymer produced per unit of catalyst is greatly enhanced by the presence of oxygen in the reaction medium. The oxygen may be introduced to the reaction medium by mixing with the olefin feed or by a separate feed of oxygen into the catalyst slurry. Of course, oxygen-bearing gases such as air may also be used. The preferred concentration of oxygen in the practice of applicant's invention is from less than about 1000 to about 10,000 p.p.m. by volume based on the olefin feed. However, oxygen is advantageously introduced within the range of less than about 50 p.p.m. to as much as 20,000 p.p.m. based on the volume of the olefin feed. The temperature of the reaction may range from 125° C. to 250° C. with 130° C. to 190° C. being preferred.

The catalyst complex referred to in this application is composed of (1) a halide or oxyhalide or mixture thereof of a transition metal of groups IV–B, V–B, and VI–B of the periodic table as found on pages 394–395 in the Handbook of Chemistry and Physics, thirty-eighth edition (1956), published by the Chemical Rubber Publishing Co., such as, for example, vanadium, titanium, tungsten, zirconium, hafnium, niobium, tantalum, chromium, or molybdenum halides. A few such compounds are: vanadium tetrachloride, vanadium trichloride, vanadium dichloride, vanadyl trichloride, vanadyl dichloride, titanium tetrachloride, titanium trichloride, titanium dichloride, zirconium tetrachloride, chromium trichloride, chromyl dichloride, titanium tetrafluoride, titanium trifluoride, titanium tetrabromide, titanium tribromide, tungsten tetrachloride, and tungsten hexachloride, and mixtures thereof. Titanium tetrachloride is most advantageously employed in this regard.

The second component of the catalyst complex is an organo-metallic compound or metal hydride such as, for example, triisobutylaluminum, trioctylaluminum, tributylaluminum, triethylaluminum, triisopropylaluminum, tridodecylaluminum, triphenylaluminum, diethylaluminum chloride, diisobutylaluminum chloride, dioctylaluminum chloride, didodecyaluminum chloride, various monohy drocarbonaluminum dihydrides, diethylaluminum hydride, diisobutylaluminum hydride, dioctylaluminum hydride didodecylaluminum hydride, aluminum hydride, diethyl beryllium, diisobutylberyllium, dioctylberyllium, didc decylberyllium, diphenylberyllium, ethylberyllium chlc ride, isobutylberyllium chloride, octylberyllium chloride beryllium hydride, dodecylberyllium chloride, lithiur hydride, phenyl lithium, naphthyl lithium, isobutyl litl ium, cyclohexyl lithium, dodecyl lithium, diethylzinc, d isobutylzinc, dioctylzinc, didodecylzinc, diphenylzinc ethylzinc chloride, isobutylzinc chloride, dicyclopropy zinc chloride, diisobutylmagnesium, dioctylmagnesiun didodecylmagnesium, diphenylmagnesium, isobutylmaf nesium chloride, octylmagnesium chloride, magnesiur hydride, and dodecylmagnesium chloride. The preferre organo-metallic cocatalysts are the trialkyl aluminur compounds having less than 13 carbon atoms in each alk} chain such as triisobutylaluminum.

The molecular ratio of the trialkylaluminum to van; dium or titanium tetrachloride can vary from about 0. to about 10 or more. The ratio employed is not narrowl critical and may be varied considerably. Thus, the pol: merization works as well at higher ratios; however, a pro ferred molar ratio for efficiency and economic operatio is from about 0.2 to about 2.0 of the organo-metallic con pound to the transition metal compound. The functic of these metallic complexes being that of catalysts or ii itiators, any catalytic amount can be used. Thus, tl concentration of the catalyst complex in the liquid dilue; may vary from about 0.1 millimol per liter to 50 or moi millimols of each component per liter of solvent.

The techniques used in combining the catalyst, dilue and monomer are well known procedures designed to e clude moisture. The organo-aluminum cocatalyst can l added to the diluent in the reaction vessel prior to tl addition of the metal halide cocatalyst; however, the various components can be added in reverse order als The monomer and oxygen may be introduced and tl vessel then sealed with subsequent stirring of the reactic mix at the desired temperature. The reaction may the take place under autogenous pressure. Alternatively, t! monomer and oxygen may be introduced continuously the desired temperature and pressure.

Pressure is not critical and is based only on practic considerations of equipment design. Polymerization c; be conducted at atmospheric, superatmospheric, or su atmospheric pressure in agitator equipped vessels. Th pressures of 0.1 atmosphere to 2000 atmospheres may used. It is preferable to maintain an inert atmosphe over the reaction medium (e.g. nitrogen). A grindi medium may also be present in the reaction mixtu (e.g. glass beads) for the purpose of decimating the met halide and continuously renewing exposed surfaces the decimated particulate metal halide to the monon and oxygen.

The period of time during which the polymerizati reaction is permitted to proceed is not critical. Th periods of as little as 5 minutes or less to 4 hours o1 days can be effectively employed. The longer the action period, the more complete the conversion.

The process of this invention is applicable to a lai group of alpha-olefins. Both branched and unbranch alpha-olefins and mixtures thereof are contemplated the formation of polymers and copolymers by the proc of this invention. A few of the unbranched olefins ethylene, propylene, 1-butene, and 1-pentene as well 1-hexene, 1-heptene, 1-octene, 1-nonene, 1-decene, 1-c decene and the like. The unbranched alpha-olefins pr erably employed contain from 2 to 12 carbon atoms.

few of the branched-chain olefins are: 3-methyl-1-butene, 4-methyl-1-pentene, 3-methyl-1-pentene, 3-methyl-1-hexene, 4-methyl-1-hexene, 3,4-dimethyl-1-hexene, 3-ethyl-1-pentene, 3-ethyl-1-hexene, 4-ethyl-1-hexene, 5-ethyl-1-hexene, 4-butyl-1-octene, 5-ethyl-1-decene and the like. A few of the copolymers which may be produced are ethylene with propylene, ethylene with 1-butene, ethylene with 1-pentene, ethylene with 1-hexene and the like. It should be noted that the term "copolymer" as employed herein refers to polymers containing two or more alpha-olefin monomers and thus includes terpolymers and the like as well.

The inert liquid hydrocarbon diluent employed may be: (1) any aliphatic hydrocarbon such as heptane, hexane, cyclohexane, and 2-ethylhexane; or (2) any aromatic hydrocarbon such as benzene, toluene, ortho-, meta- and paraxylene; also (3) a mixture of hydrocarbons may be used. However, the hydrocarbon diluent must be free of impurities of unsaturated compounds, sulfur-containing compounds and compounds containing active hydrogen such as alcohols, amines and water. The preferred inert diluents are Bayol D (a purified kerosene) and heptane. It is desirable to have at least one percent by weight of monomer in the diluent during polymerization although the concentration may vary from about one to seventy percent or higher.

The following examples are illustrative of the invention.

EXAMPLE 1

A series of polymerizations was carried out by the following procedure:

One thousand milliliters of Bayol D (a purified kerosene) were placed in a two liter resin flask equipped with an air driven paddle stirrer, a thermometer, an inlet tube extending below the surface, and an outlet tube. To this there were added 20 millimols of triisobutylaluminum in a small amount of purified hexane (about 20 ml.) and 20 millimols of titanium tetrachloride, which had also been slurried in a small amount of hexane (about 20 ml.). The mixture was stirred and heated to 150° C. and maintained at that temperature. Ethylene containing a predetermined amount of oxygen was then passed into the solution at the rate of one liter per minute for a period of one hour. Isopropanol was then added to quench the catalyst in the mixture. The polymer slurry was poured into about a liter of isopropyl alcohol and was stirred for a few minutes. The resin was then filtered off and dried. The results of the polymerization with varying amounts of oxygen is given in Table I.

*Table 1*

| Test No. | Feed | Yield, g. | Melt Index [1] |
|---|---|---|---|
| 1 | Ethylene containing about 1,200 p.p.m. by volume of $O_2$. | 22 | 5.4 |
| 2 | Ethylene containing about 20-50 p.p.m. by volume of $O_2$. | 19 | 0.42 |
| 3 | Ethylene purified by passing it through alkaline pyrogallol to remove $O_2$. | 11 | 0.77 |
| 4 | Same as No. 3 | 14 | 0.31 |
| 5 | Ethylene containing a total of about 2,500 p.p.m. by volume of $O_2$. | 44 | 0.84 |
| 6 | Ethylene containing a total of about 4,000 p.p.m. by volume of $O_2$. | 40 | 10 |
| 7 | Ethylene containing a total of about 12,000 p.p.m. by volume of $O_2$. | 24 | 16 |

[1] Melt index is determined by ASTM Test Method D 1238-52T.

EXAMPLE 2

A ten-gallon, glass-lined autoclave was charged with 915 parts (5 pounds equals 100 parts) of dry, acid-washed heptane and heated to 140° C. under a dry nitrogen atmosphere. To this was added 0.48 part titanium tetrachloride and 0.46 part triisobutylaluminum (Al:Ti=0.93) with agitation. An ethylene mixture containing 1200 p.p.m. of oxygen (as 0.6% air), by volume of the ethylene, was then added to the autoclave at a rate sufficient to maintain a reactor pressure of 90 p.s.i.g. The temperature went out of control immediately, reaching almost 150° C. within a few minutes after the beginning of the reaction. Temperature control was restored by throttling the flow of the ethylene mixture. After the first vigorous reaction had subsided, each catalyst component and additional diluent was added in small portions from time to time. Each addition of catalyst caused a marked increase in polymerization rate, and was accompanied by difficulty in maintaining temperature control. At the end of 200 minutes, the reaction was arbitrarily stopped. One hundred parts of ethylene had been passed into the reactor. In addition to the original quantities of catalyst and diluent, an additional 1.66 parts titanium tetrachloride, 1.62 parts triisobutylaluminum and 53 parts heptane had been added to the autoclave prior to stopping of the reaction. The contents of the autoclave were poured into isopropanol, and the resin was worked up and recovered in the usual manner. Four and three-tenths pounds of polyethylene having a melt index of 80, and a density of 0.964 were obtained.

EXAMPLE 3

This example was run with a mixture of ethylene and air in the same manner as that of Example 2. At the end of 220 minutes the reaction was arbitrarily stopped. Eighty-five parts of ethylene containing about 1200 p.p.m of oxygen by volume and a total of 1.23 parts titanium tetrachloride and 1.19 parts of triisobutylaluminum were used to effect the polymerization of 5.5 pounds of polyethylene having a melt index of 210 and a density of 0.965. The polymer was recovered in the same manner as that described in the preceding examples.

EXAMPLE 4

This example was run in the same manner as the preceding two examples, except that the ethylene was substantially free of air and contained no more than about 50 p.p.m. of $O_2$ by volume, based on the ethylene. Titanium tetrachloride, 5.95 parts, and triisobutylaluminum, 5174 parts, (Al:Ti=0.93), yielded only 2.8 pounds of polyethylene having a density of 0.964 and a melt index of 1.4 in a reaction period of 250 minutes. The reaction had stopped prior to the 250 minutes and the violent reaction observed in the previous two examples did not occur.

The organo-metallic compounds or metal hydrides that may be used with the titanium trichloride are those compounds of groups I–A, II–A, and III–A of the periodic table and may be exemplified by formulas such as:

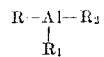

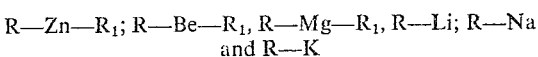

R—Zn—$R_1$; R—Be—$R_1$, R—Mg—$R_1$, R—Li; R—Na and R—K wherein R is a member selected from the group consisting of hydrogen and a monovalent hydrocarbon radical; each of $R_1$ and $R_2$ is a member selected from the group consisting of hydrogen and a monovalent hydrocarbon radical and halogen when no hydrogen is directly attached to the metal. In the preferred method R is a member selected from the group consisting of hydrogen, an aromatic hydrocarbon radical contains 6 to 12 carbon atoms, a saturated aliphatic hydrocarbon radical containing two to twelve carbon atoms and a saturated cycloaliphatic hydrocarbon radical containing 3 to 12 carbon atoms; each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 12 carbon atoms, an aromatic hydrocarbon radical containing six to twelve carbon atoms and halogen when no halogen is directly attached to the metal.

What is claimed is:

1. A process for polymerizing an alpha-olefin containing 2 to 12 carbon atoms at a temperature of 130° C. to 190° C. which comprises admixing said alpha-olefin with from 1,000 to 10,000 p.p.m. of molecular oxygen, based on the volume of the alpha-olefin, and subsequently forming a polymer by contacting the mixture of oxygen and alpha-olefin with a catalyst slurry composed of: an inert liquid hydrocarbon diluent; an inorganic halide of a transition metal selected from the group consisting of group IV-B, V-B and VI-B of the periodic table; and a compound selected from the group consisting of

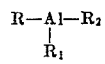

R—Zn—$R_1$, R—Be—$R_1$, R—Mg—$R_1$ and R—Li, wherein Al is aluminum, Mg is magnesium, Zn is zinc, Be is beryllium, Li is lithium, R is a member selected from the group consisting of hydrogen, an aromatic hydrocarbon radical containing six to twelve carbon atoms, a saturated aliphatic hydrocarbon radical containing two to twelve carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing two to twelve carbon atoms, a saturated cycloaliphatic hydrocarbon radical containing 3 to 12 carbon atoms, an aromatic hydrocarbon radical containing 6 to 12 carbon atoms and a halogen when no hydrogen is directly attached to the metal.

2. The process of claim 1 wherein the alpha-olefin is ethylene.

3. The process of claim 1 wherein the catalyst slurry is composed of an inert liquid hydrocarbon diluent, titanium tetrachloride and a trialkylaluminum compound containing 2–12 carbon atoms in each alkyl chain.

4. The process for polymerizing ethylene at a temperature of 130° C. to 190° C. which comprises admixing the ethylene with 1000 to 10,000 p.p.m. of oxygen by volume, based on the volume of ethylene feed, and subsequently progressively passing the mixture into a catalytic amount of a catalyst slurry composed of an inert liquid hydrocarbon diluent, titanium tetrachloride and triisobutyl-aluminum.

5. The process of claim 4 wherein the inert liq hydrocarbon diluent is hexane.

6. The process of claim 4 wherein the inert liq hydrocarbon diluent is heptane.

7. The process of claim 4 wherein the inert liq hydrocarbon diluent is purified kerosene.

8. In the process for polymerizing an alpha-olefin c taining from 2 to 12 carbon atoms by contacting said pha olefin with a catalytic amount of a catalyst comple: an inert liquid hydrocarbon diluent wherein the cata complex is composed of: (a) an inorganic halide o transition metal selected from the group consiting group IV-B, V-B and VI-B of the periodic table; an compound selected from the group consisting of

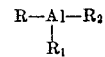

R—Zn—$R_1$, R—Be—$R_1$, R—Mg—$R_1$ and R—Li, wh in Al is aluminum, Mg is magnesium, Zn is zinc, B beryllium, Li is lithium, R is a member selected from group consisting of hydrogen, an aromatic hydrocar radical containing six to twelve carbon atoms, a satur; aliphatic hydrocarbon radical containing two to tw carbon atoms and a saturated cycloaliphatic hydrocar radical containing 3 to 12 carbon atoms, each of $R_1$ $R_2$ is a member selected from the group consisting hydrogen, a saturated aliphatic hydrocarbon radical c taining two to twelve carbon atoms, a saturated cy aliphatic hydrocarbon radical containing 3 to 12 car atoms, an aromatic hydrocarbon radical containing ( 12 carbon atoms and a halogen when no hydroge: directly attached to the metal; the improvement wl comprises conducting the process at a temperature 125° C. to 250° C. while the said alpha-olefin is in con with from 1,000 to 20,000 p.p.m. of molecular ox} based on the volume of alpha-olefin.

References Cited in the file of this patent

UNITED STATES PATENTS

| | | |
|---|---|---|
| 1,140,429 | Du Pont | Mar. 4, 1 |
| 2,822,357 | Brebner et al. | Feb. 4, 1 |
| 2,827,446 | Breslow | Mar. 18, 1 |
| 2,827,447 | Nowlin et al. | Mar. 18, 1 |
| 2,839,518 | Brebner | June 17, 1 |
| 2,868,771 | Ray et al. | Jan. 13, 1 |